No. 733,455. PATENTED JULY 14, 1903.
J. A. BRIDGES.
SAFETY CLUTCH FOR ELEVATORS.
APPLICATION FILED OCT. 28, 1902.
NO MODEL.

WITNESSES:
M. N. Wheeler.
A. R. Doyle.

INVENTOR.
JOSEPH A. BRIDGES
BY
Mundrow Vale &Co.
ATTORNEYS.

No. 733,455. Patented July 14, 1903.

UNITED STATES PATENT OFFICE.

JOSEPH A. BRIDGES, OF SAN FRANCISCO, CALIFORNIA.

SAFETY-CLUTCH FOR ELEVATORS.

SPECIFICATION forming part of Letters Patent No. 733,455, dated July 14, 1903.

Application filed October 28, 1902. Serial No. 129,149. (No model.)

*To all whom it may concern:*

Be it known that I, JOSEPH A. BRIDGES, a citizen of the United States, residing at 114 Congo street, in the city of San Francisco, county of San Francisco, and State of California, have invented certain new and useful Improvements in Safety-Clutches for Elevators; and I do hereby declare the following to be a full, clear, and exact description of the said invention, such as will enable others skilled in the art to which it most nearly appertains to make, use, and practice the same.

This invention relates to improvements in safety-clutches for elevators, and has for its object to provide means for stopping the elevator in the event of accident to its operating mechanisms, such as a broken cable or other mishap in which the cage is liable to drop and cause damage.

The invention consists, broadly, of clutches located on both sides of the elevator-guides and mounted on independent shafts extending across under the floor of the cage, having transverse levers fixed thereon and extending over arms located on a rocking shaft operated by a link connection having a pull-handle near the hand of the cage operator, whereby the clutches may be thrown into contact with the elevator-guides by either an upward or a downward operation of the said pull-handle.

Figure 1:
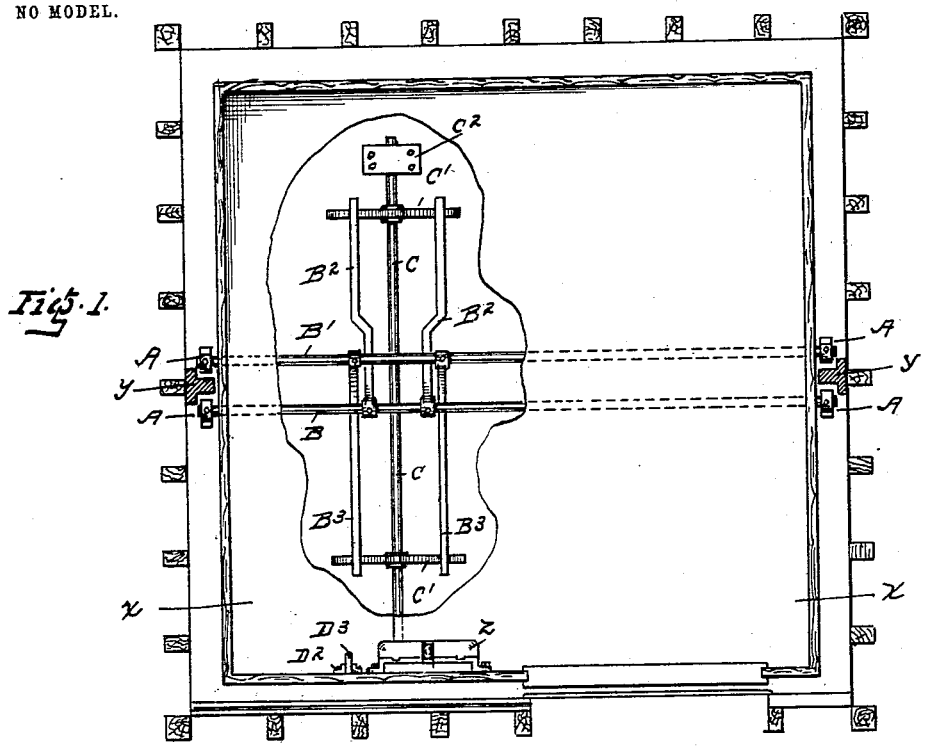
Figure 2:
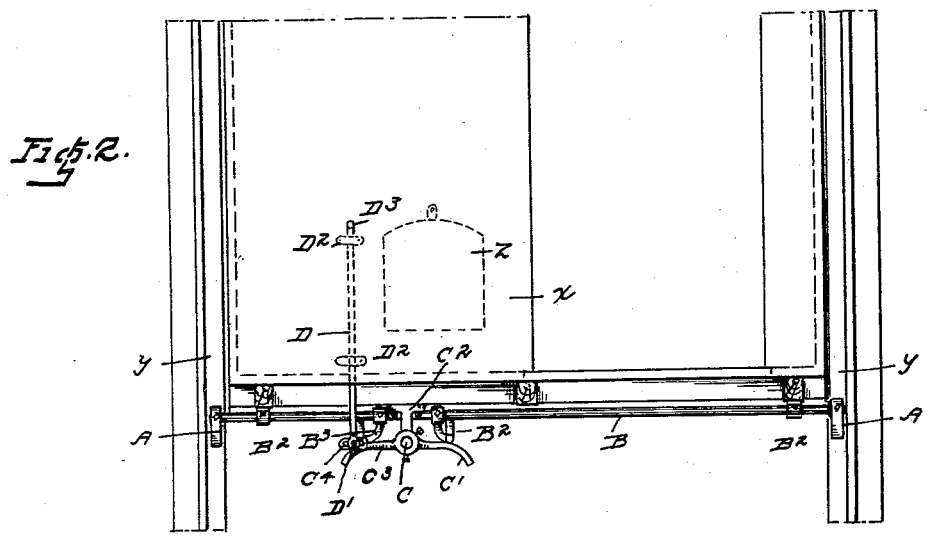

In the drawings, Figure 1 is a plan view from above in cross-section, showing the elevator-shaft and cage with this invention applied thereto, the floor of the cage being broken away to show the operation of the mechanisms of the invention. Fig. 2 is a front elevation of the same.

In detail the construction consists of the clutches A, fixed on the ends of the shafts B B', which are hung in the boxes $B^2$ on under side of the cage X in such a manner that the clutches normally clear the side of the guides Y. The shafts B B' are oscillated by the transverse levers $B^2 B^3$, arranged in sets of two fixed on each of the shafts B B', extend across the levers $B^2$, fixed on the shaft B and under the shaft B'. The levers $B^3$ are fixed on the shaft B' and extend across and under the shaft B. The terminals of each set of levers rest on the cam-arms C', adjustably fixed on the rocking shaft C, which is mounted in the hinges $C^2$ on the bottom of the cage. The rocking shaft is oscillated by the arm $C^3$, fixed thereon and connected to the pull-rod D. The slot $C^4$ in the arm through which the pin D' in the arm D extends compensates for the arc the arm describes in its swing. The pull-rod D consists of a bar or strap of metal extending from the arm $C^3$ upward through the guides $D^2$ to within easy reach of the elevator operator, terminating in a convenient handle $D^3$. The operating-handle $D^3$ is placed conveniently near the elevator-controller Z. In the event of accident the operator grabs the handle $D^3$, which is adapted to throw the clutches into action whether the handle is pushed or pulled. This insures the desired result should the operator become confused. At the first intimation of danger a pull (or push) of the handle $D^3$ operates, through the arm $C^3$, to rock the shaft C, which throws the cam-arms C' into action with the levers $B^2 B^3$, which, by reason of their duplication and arrangement, are thrown upward, which throws the clutches A into contact with the guides Y, into which they are embedded by the gravitation of the cage. The clutches being set on pivot eccentric to their operative faces are caused to jam and stop the cage, the worst result being a few feet of damaged guides Y.

The arms C', fixed on the shaft C by a set-screw, are adjustable laterally. This allows for adjusting the swing of the levers $B^2 B^3$, it being obvious the nearer the arms are set to the fulcrum of the levers the longer the swing of the same, and vice versa. The arms $B^2 B^3$ being similarly attached may be set on their respective shafts at any desired point.

As illustrated the clutches are shown as operating upon wooden guides. When applied to iron guides, the large teeth in the clutches may be displaced by sharp rasp surfaces adapted to grouch into the guide.

Having thus described this invention, what I claim, and desire to secure by Letters Patent, is—

1. A safety-clutch for elevators comprising a rock-shaft, a crank-arm keyed thereto, a pull-rod pivotally connected to said crank-arm, independent parallel clutch-shafts, clutches mounted on said shafts, operating-levers arranged in pairs and keyed to said clutch-shafts, and cams keyed to said rock-shaft and adapted to engage the ends of said operating-levers, as set forth.

2. A safety-clutch for elevators, comprising a rock-shaft, means for rocking the same, cams secured to said shaft, parallel clutch-shafts, clutch members carried thereby, and levers keyed to said clutch-shafts and resting upon said cams, as set forth.

3. A safety-clutch for elevators comprising a rock-shaft, means for rocking the same, cams adjustably secured to said shaft and having downwardly-curved arms, parallel clutch-shafts, clutch members carried thereby, and operating-levers keyed to said clutch-shafts and arranged in pairs, the free ends of said levers resting upon the curved arms of said cams.

In testimony whereof I have hereunto set my hand this 6th day of October, 1902.

JOSEPH A. BRIDGES.

Witnesses:
BALDWIN VALE,
A. C. DOYLE.